US009430700B2

(12) United States Patent
Yagcioglu et al.

(10) Patent No.: US 9,430,700 B2
(45) Date of Patent: Aug. 30, 2016

(54) SYSTEM AND METHOD FOR OPTIMIZING TRACKER SYSTEM

(75) Inventors: Mustafa Yagcioglu, Ankara (TR); Erkan Yavuz, Ankara (TR); Ozgur Yilmaz, Ankara (TR); Selcuk Sandikci, Eindhoven (NL)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 138 days.

(21) Appl. No.: 14/342,526

(22) PCT Filed: Feb. 22, 2012

(86) PCT No.: PCT/IB2012/050801
§ 371 (c)(1),
(2), (4) Date: Mar. 3, 2014

(87) PCT Pub. No.: WO2013/124706
PCT Pub. Date: Aug. 29, 2013

(65) Prior Publication Data
US 2014/0212000 A1    Jul. 31, 2014

(51) Int. Cl.
*G06K 9/00* (2006.01)
*G06T 7/00* (2006.01)

(52) U.S. Cl.
CPC ......... *G06K 9/00362* (2013.01); *G06T 7/0042* (2013.01); *G06T 2207/10016* (2013.01); *G06T 2207/30204* (2013.01)

(58) Field of Classification Search
CPC ............... G06K 9/00362; G06T 2207/10016; G06T 2207/30204; G06T 7/0042; G06F 3/012; G02B 2027/0187
See application file for complete search history.

(56) References Cited

U.S. PATENT DOCUMENTS

| | | | | |
|---|---|---|---|---|
| 2002/0024675 A1* | 2/2002 | Foxlin | ................... | G02B 27/017 356/620 |
| 2004/0239756 A1* | 12/2004 | Aliaga | ................. | G05D 1/0234 348/36 |
| 2014/0368664 A1* | 12/2014 | Yagcioglu | ............... | G01S 5/163 348/169 |
| 2016/0063708 A1* | 3/2016 | Okuyan | ................ | G06T 7/0042 382/103 |

OTHER PUBLICATIONS

Davis L et al: "A Method for Designing Marker-Based Tracking Probes", Mixed and Augmented Reality, 2004. ISMAR 2004. Third IEEE and ACM Inte Rnational Symposium on Arlington, VA,USA, IEEE, Nov. 2, 2004, pp. 120-129. XP10769635, DOI:10.1109/ISMAR.2004.5 ISBN:978-0-7695-2191-6 the whole document.

Jansen et al.:"Performance Improvement for Optical Tracking by Adapting Marker Arrangements", VR Workshop on Trends and Issues in Tracking for Virtual Environments, Jan. 1, 2007, pp. 28-33,XP002679938,Retrieved from the Internet: URL: http://viscg.uni-muenster.de/publications/2007/JSHVS07/ [retrieved on Jul. 16, 2012] the whole document.

* cited by examiner

*Primary Examiner* — Bhavesh Mehta
*Assistant Examiner* — Ian Lemieux
(74) *Attorney, Agent, or Firm* — Gokalp Bayramoglu

(57) ABSTRACT

The present invention relates to the field of computation and simulation and covers methods to optimize the fiducial marker positions in optical object tracking systems, by simulating the visibility. The method for optimizing tracker system which is realized to simulate camera and fiducial positions and pose estimation algorithm parameters to optimize the system comprises the steps of; acquire mesh data representing possible active marker positions and orientations on a tracked object, pose data representing possible poses of tracked object, camera positions and orientations; compute visibility of each node from all camera viewports and generate a visibility value list; select the node with highest visibility count as a marker placement node; remove nodes closer to the selected node than a threshold; remove the pose(s) having a predetermined number of selected nodes; does percentage of all poses have predetermined number of selected nodes?; project selected node positions on the image plane of each camera viewport and calculate the pose of the mesh using the tracker algorithm to be optimized; calculate pose error and pose coverage by comparing algorithm results with initial data; record and output results; and select among the results a parameter set satisfying at least one constraint.

18 Claims, 4 Drawing Sheets

SYSTEM AND METHOD FOR OPTIMIZING TRACKER SYSTEM

FIELD OF THE INVENTION

The present invention relates to the field of computation and simulation and covers methods to optimize the fiducial marker positions in optical object tracking systems, by simulating the visibility.

BACKGROUND OF THE INVENTION

It is known that there are methods and models to track a three dimensional object in an environment and compute its position and orientation (pose) with respect to a predetermined coordinate system. These kinds of tracker systems are used for example in aircrafts to determine the orientation of head of the pilot. Once the orientation is acquired with respect to the coordinate system of say the display devices, then it is possible to generate graphics on these accordingly. There are different methods to track an object in the scene using magnetic, mechanical or optical means. Currently, the spatial relations of objects may also be determined using magnetic sensors or laser beams but this invention relates specifically to systems using camera-based (day-tv, thermal, IR, Time of Flight etc.) trackers.

In one of the optical camera-based systems the pilot wears a helmet with patterns (fiducial markers) and at least one tracker camera determines the helmet's position and orientation using geometric calculations based on these patterns. Computing spatial relation between an object having a tracking pattern, and a camera is therefore, well known in the state of the art. Throughout the document, whenever a spatial relation is mentioned, it should be understood that the relation between an entity's predetermined reference system with respect to the other's is meant. Determining the position and orientation of an entity using fiducials is called the pose estimation problem and it can be stated as follows: given a set of N feature correspondences between three dimensional (3D) points of an object and two dimensional (2D) projection of that object onto the image plane, find the rotation and translation of the object with respect to the reference system of the camera. The objective is to find rotation and translation between camera and 3D object so that the object's 3D location and orientation is known. This reference system is generally based on the respective pattern of an object under consideration. Since the position and orientation of the tracker camera with respect to the other coordinate systems is known (or can be calculated or measured) in a tracker system, it is also possible to compute the helmet's spatial relation with the tracker camera's sensor and then with other coordinate systems. In this context, "tracked object" means an object having a tracking pattern (fiducial marker) and being tracked by a tracker system. It may be either a helmet as in a helmet-mounted tracker system or any other object.

The patterns used in camera-based tracker systems are either graphical (generally black and white) patterns (passive marker) tracked by visible light cameras or arrays of light sources (e.g. light emitting diodes or LEDs) (active marker). These light sources can be chosen to be in the infrared range of the electromagnetic spectrum with suitable selection of camera sensor and filter set. Other arrangements are also possible but the most convenient among them is the one with the infrared LEDs since these systems can work under inappropriate lighting conditions. The positions (locations) of these LEDs on the tracked object should be determined mindfully to make sure that a small pose error is attained and pose coverage is high. There are some currently used methods to determine and optimize the positions of fiducial markers. In one of such used methods, number of visible fiducials and their relative angle with respect to the optical sensor is used as a constraint to determine optimal fiducial positions. This method is intended to be used in large areas with fiduciary marks and can not be applied to optimize fiducial locations on a moving tracked object being captured by a stationary camera. In addition, when a helmet mounted tracking system is considered, the motion trend of the pilot should also be considered when calculating the fiducial visibility. Furthermore, the pose estimation parameters used by the pose estimation algorithm are not considered in the current methods, which directly affect the output accuracy of the system.

The current methods are not offering an effective way of simulating a tracker system's camera and fiducial positions to optimize the system's pose estimation accuracy altogether. To provide a solution to this problem, a new methodology should be introduced which uses further steps to determine the fiducial positions on a tracked object, which is moving in front of a stationary camera.

The United States patent document US2004239756, an application in the state of the art, discloses a method which uses number of visible fiducials and their relative angle with respect to the capture device as a constraint to determine optimal fiducial positions and compute error bounded pose.

SUMMARY OF THE INVENTION

An objective of the present invention is to simulate a tracker system's camera and fiducial positions and pose estimation algorithm parameters to optimize the system.

DETAILED DESCRIPTION OF THE INVENTION

A system and method realized to fulfil the objective of the present invention is illustrated in the accompanying figures, in which.

Figure 1:
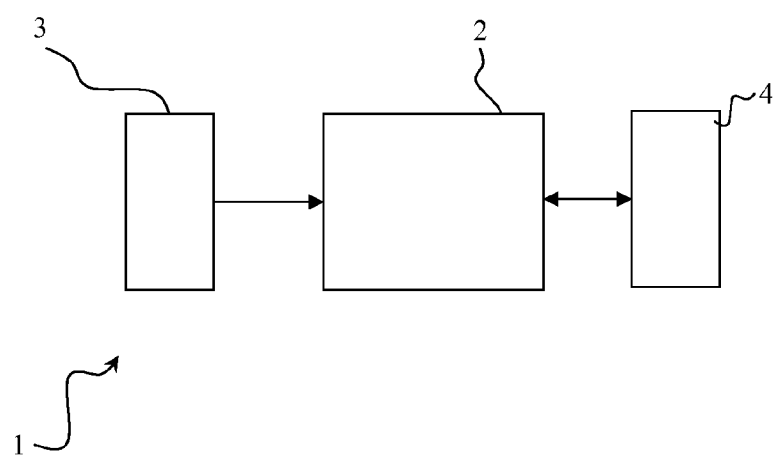
FIG. 1 is the schematic view of the preferred embodiment system.
Figure 2:
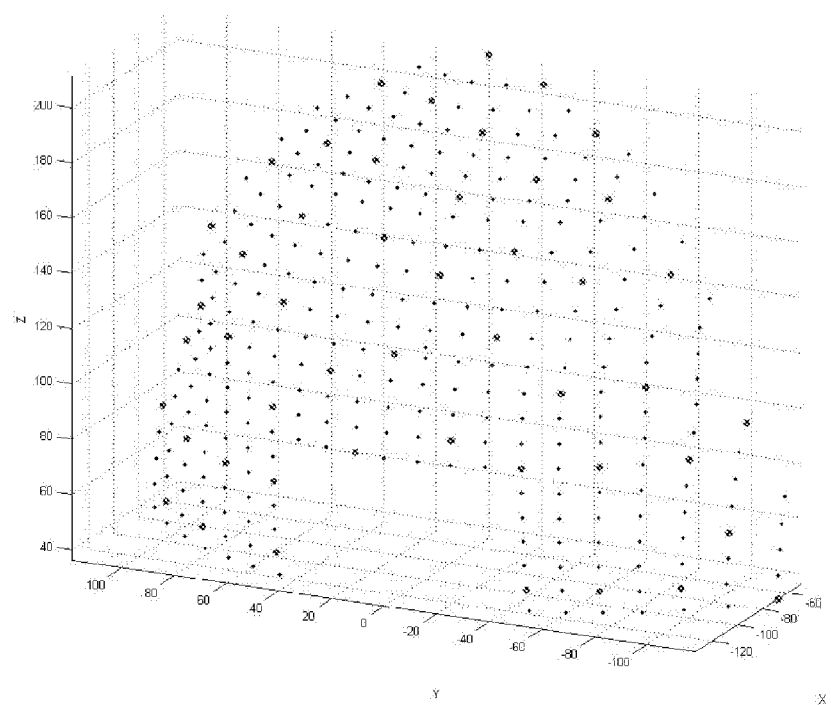
FIG. 2 shows graph of a mesh of possible fiducial positions on the object.

The components illustrated in the figures are individually referenced where the numbers and letters refer to the following:

1. System for optimizing tracker system
2. Processing unit
3. Input/output device
4. Memory unit
100. Method for optimizing tracker system A method for optimizing tracker system (100) fundamentally comprises the following steps,
- acquire mesh data representing possible active marker positions and orientations on a tracked object; pose data representing possible poses of tracked object under working conditions; and at least one camera position and orientation (101),
- compute visibility of each node on the mesh from all camera viewports for every pose and generate a visibility value list, counting how many times a node is visible where visibility from any camera per pose is counted once (102), select the previously unselected node with highest visibility count as an active marker placement node (103), remove nodes which are closer to the selected node than a non-maxima suppression threshold (104), remove the pose(s) having a predetermined number of selected nodes (105), does a predetermined percentage of all poses have predetermined number of selected nodes? (106), project the final selected node positions on the image plane of each camera viewport for each pose, and calculate the pose of the mesh with respect to camera viewports using the tracker algorithm for which the system will be optimized (107), calculate pose error and pose coverage by comparing algorithm results with the ground truth data (108), record and output pose accuracy and coverage results together with respective number and position of placed active markers (109), does a new optimization parameter set, pose estimation parameter set, camera location set or 3D object mesh exist? (110), select among the results a camera location set, 3D mesh data, marker tree, optimization parameter set and pose estimation algorithm parameter set, satisfying at least one constraint (111).

First, the possible positions of active fiducials on the tracked object (say a helmet for a head tracking system with infrared LEDs) are mathematically modeled to convert the problem into a discrete optimization problem. To represent a model mathematically, there are various currently known methods and a very basic example can be representing each position on the object with a three dimensional coordinate. It is important to note that these coordinates on the mesh (model) are determined with respect to a common coordinate system and should be relatable to the possible camera locations. At the same time pose data representing possible poses of tracked object under working conditions should also be introduced. In a preferred configuration of the present invention, these data are acquired using inertial measurement units (IMU) placed on the real object under real working conditions and movements of the objects are recorded to be used as the pose data. Another option is using an optic based pose estimation setup with many high resolution cameras that is capable of generating accurate and complete pose data and active markers mounted on tracked object This data acquisition system is different from the actual hence is expected to more accurately and completely acquire pose of the object under real working conditions. These data is again discrete and represents many possible poses of the object under various motion scenarios. As indicated, this data should be considered in calculations to effectively simulate real working conditions. As an example, these represent the head motion of a pilot in an aircraft which uses a head tracking system.

In the case of an aircraft, the cockpit (or room) that the head tracker will operate is generally known and camera(s) can virtually be located inside the cockpit 3D model with respect to the nominal head position of the person of interest (i.e. pilot). This can be used to generate the pose database that the optimization will utilize. Even though there are mechanical and system related limits on the camera locations, there is a margin that the cameras can be placed and the optimum location will be explored using the outputs of the proposed optimization algorithm.

Knowing relative spatial positions of tracked object and camera, it is possible to translate and rotate the mesh mathematically using the input pose data, and visibilities of fiducials can be calculated. In the next step (102) visibility of each node on the mesh from all camera viewports for every pose is calculated and a visibility value list is generated representing every node. Visibility value represents how many times a node was visible from at least one camera viewport, considering all pose data. Visibility from any camera per pose is counted only once. When there is more than one camera in the actual pose estimation system, a position on the mesh should be visible from at least one camera, to be counted as visible; and multiple visibilities from different viewports are eliminated.

In a preferred configuration, an occlusion model is used to estimate the visibility of 3D model points (active markers) given the pose (Davis et al., 2004). It is based on ray tracing technique developed in computer graphics. In the case of LED fiducials, the visibility computation is based on the LED's normal with respect to the object coordinate system, LEDs illumination cone angle and the known pose of the head. The angle between the LED's normal and camera plane normal in camera coordinate system defines how perpendicular the LED is directed towards the camera (LED direction angle). The LED's illumination cone angle defines a minimum LED direction angle threshold for the LED to be visible for the camera. For a given pose, LED direction angle can be computed for each LED to determine its visibility. The marker's normal with respect to the object coordinate system, marker's illumination cone angle and the known pose of the object can equivalently applied to any active marker tracking system.

Then the node with highest visibility count is selected as an active marker placement node in a step (103). The node with the highest visibility count, which was not determined as a marker node previously, is selected since it is visible for most of the determined camera position(s) and pose data. This node will represent a marker placement position. Following the marker placement, nodes which are closer to the selected node than a non-maxima suppression threshold are removed in a step (104) to prevent selection of a very close node in the following iteration.

In order to conclude the marker placement process, the algorithm requires a predetermined percent (say X) of the poses having at least a predetermined number (say K) of placed markers visible. In this stage, the total number of markers (selected and placed so far) that are visible for each pose is computed to inspect which poses exceed a K marker limit. As the marker placement proceeds, it is expected that at some number of markers, X percent of the poses will have at least K number of visible markers. However, during this process if a pose satisfies this condition, this pose should be excluded from the pose database. This will ensure that, in the mesh marker visibility analysis, marker location sorting is executed for the poses that still have insufficient number of visible markers. This exclusion prevents unnecessary placement of markers for poses that already have enough number of visible markers. Therefore the pose(s) having predetermined number of selected nodes are removed in step (105) and marker placement is stopped if sufficient percentage of all poses has enough selected nodes (106).

When the marker placement procedure end after the predetermined percentage of all poses have at least K markers, 3D coordinates of the selected nodes (which is called a marker tree) are passed to optical head tracking algorithm. Markers are projected onto the image plane for each pose as if they are being viewed from each camera in step (107). Also these 2D marker images are passed to the pose estimation algorithm that will be used in the simulated system. In the case of LED markers, they are represented as points on the 2D plane and a certain amount noise is added to generate a synthetic LED centroid image in a preferred configuration. Pose estimation algorithm estimates pose for the given marker images (or LED coordinates and centroid image) independently for each pose.

In step (108), the accuracy and coverage (percent of poses that can be estimated with pose estimation algorithm) of the algorithm for the camera location-marker tree-pose estimation algorithm configuration is tested. Pose error is computed and the poses that the algorithm is unable to compute are accepted as hidden poses. Since the real positions of the markers are known when the input mesh and camera location data is first fed to the simulation they can be used to determine pose error by comparing them with the pose estimation algorithm results (ground truth data).

A good marker tree configuration is expected to have small pose error and small percent hidden poses (inverse of pose coverage) with minimal number of markers. There are many parameters in the marker location optimization and pose estimation: Camera locations, Field of View of cameras, LED illumination angle (in case of an active LED marker), K (min no of markers visible for each pose), non-maxima suppression distance threshold, image noise on centroids, and many parameters for pose estimation algorithm.

This optimization and simulation environment can be used to find:
1. Camera locations
2. 3D model of the object through mesh data
3. Marker tree and optimization parameter set
4. Pose estimation parameters.

Thus, it is a complete environment for system and algorithm design. The parameters are systematically varied in a preferred configuration and 3 outputs are recorded: pose error, percent hidden poses and number of placed markers in step (108). The whole method can be implemented with different input data and pose estimation algorithms to compare their results. The position of markers for each parameter set is output and recorded with their respective marker counts in a step (109). Pose accuracy and coverage results are also recorded in this step. As the tracked object model, pose space and possible camera locations changes according to changes in the system, cockpit or mechanical designs (as in an aircraft example), the optimization routine can be re-executed to fine tune camera location, to find marker tree and adjust pose estimation algorithm. If there is a new data set to be compared, the method starts over with the new data from step (101), following the check (110). These data includes optimization parameter sets, pose estimation parameter sets, camera location sets or 3D object meshes to be processed.

Figure 3:
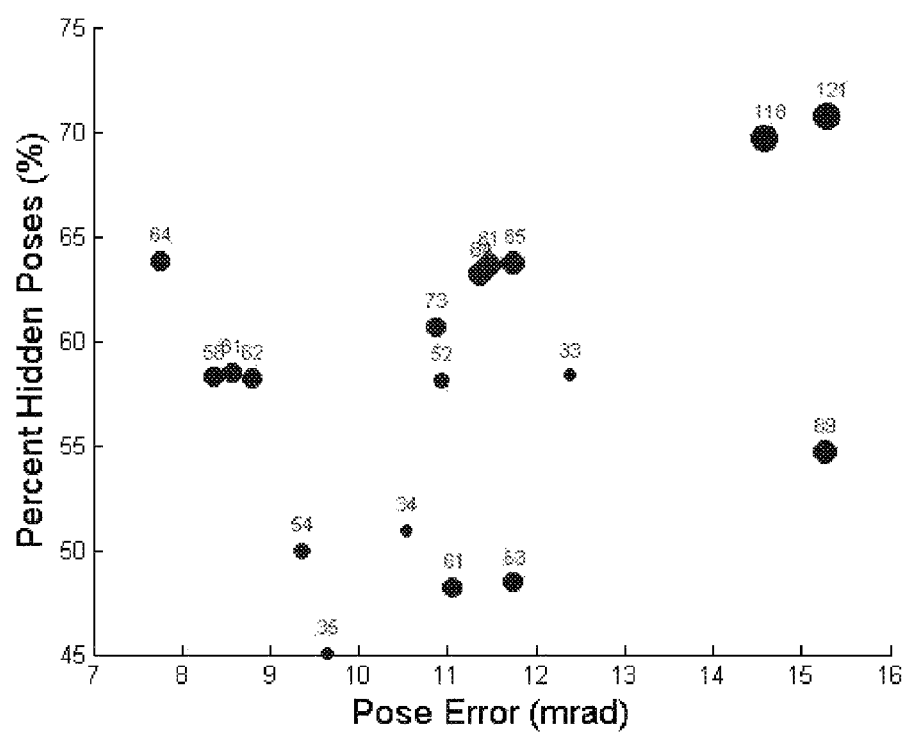
FIG. 3 shows the graph of the result of the optimization routine.
Figure 4:
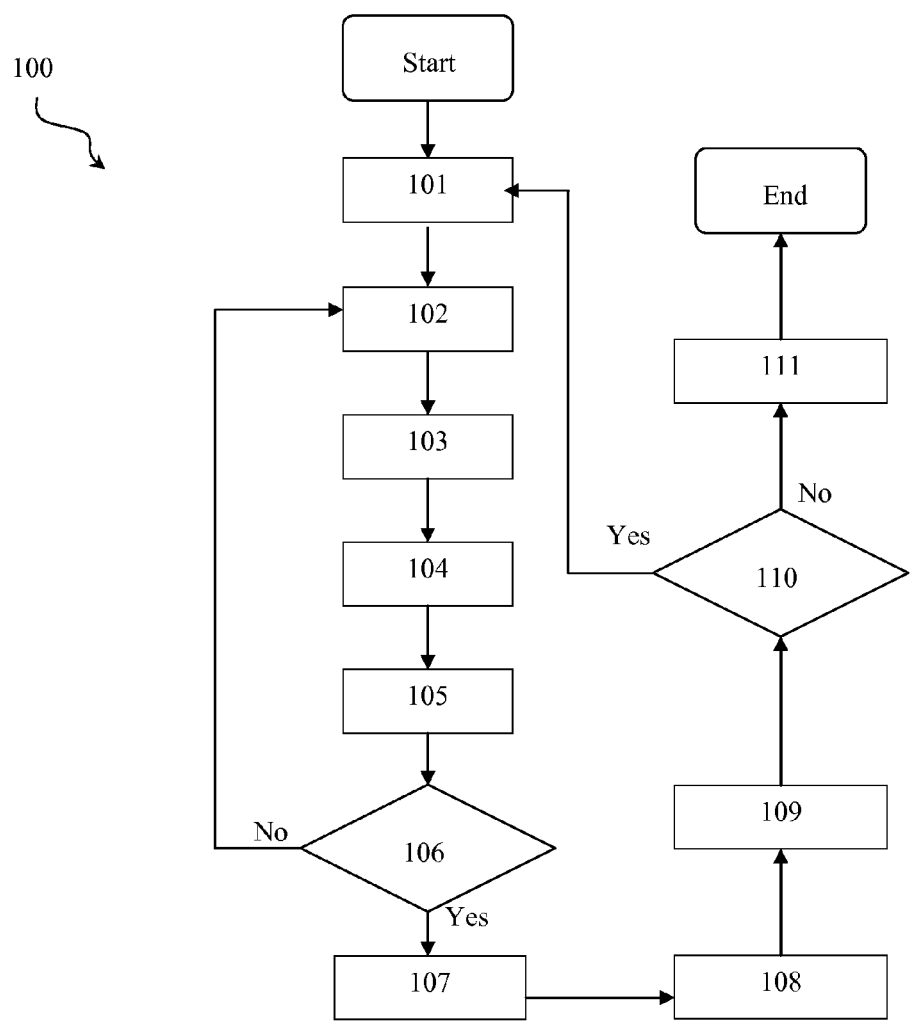
FIG. 4 is the flowchart of the preferred method of the present invention.

A sample output of parameter configurations are plotted. X and Y axes are pose error and percent hidden poses, whereas number of markers are encoded in the dot size and also written as text on the plot. The output of the simulation provides choices to systems engineers for selecting configurations according to the constraints on acceptable active marker number and pose estimation accuracy. (FIG. 3)

Among this final set of parameters used to generate results, a camera location set, 3D mesh data a marker tree, an optimization parameter set and a pose estimation algorithm parameter set, satisfying at least one constraint is chosen as optimized pose estimation system parameters in step (111). Optimization parameter is basically the non-maxima suppression distance threshold, predetermined number of selected and predetermined percentage of all poses having a predetermined number of selected nodes. In a preferred configuration the mentioned constraint can be one of the following; choosing a parameter set with the minimum pose error, a system with the minimum hidden poses or a system with the minimum marker number. In another preferred configuration, the constraint is a combination of the above constraints. For example when there is not any constraint on available marker position; the system with minimum pose error and percent hidden poses can be selected or when there is not any constraint on hidden poses; the system with minimum number of markers and a minimum marker number is selected.

In a preferred configuration of the present method, remove the pose(s) with enough selected nodes (105) step is not executed before placing a predetermined number of markers to the initial mesh. This ensures elimination of at least one pose in step (105). In yet another configuration, the process is routed to step (110) if there is not any empty available node to select as active marker placement node in step (103). This situation means that current mesh is not appropriate to place enough markers for the given parameters and configuration. Method is continued by receiving a new data set if available.

A system for optimizing tracker system (1) fundamentally comprises;
- at least one processing unit (2) configured to receive pose, mesh and camera position data and implement the method for optimizing tracker system (100) using this data; to implement the tracker algorithm for which the system will be optimized and output results found by the method (100),
- at least one input/output device (3) connected to processing unit (2) configured to receive pose, mesh and camera position data, from an outside source such as a user; and output results found by processing unit (2),
- at least one memory unit (4) connected to processing unit (2); configured to store, when necessary, the optimization results found by processing unit (2) and any pose, mesh and camera position data.

In a preferred embodiment of the present invention, processing unit (2) is configured to receive pose, mesh and camera position data from the input/output device (3). Method (100) is applied on a sequence of pose data (representing possible orientations and locations of the tracked object) and a single mesh data (representing the possible LED positions on the tracked object) for each data set. In another embodiment of the present inventive system (1), processing unit (2) is configured to receive pose, mesh and camera position data from the memory unit (4). This way, it is possible to analyze and simulate previously recorded data without the need for new data set acquisition.

Input/output device (3) is preferentially configured to receive at least one pose data of the tracked object under consideration by any known means such as optical/magnetic or laser tracking. This pose data is preferentially relative to a predetermined reference frame which is relative to at least one camera position in the actual tracking system under consideration. In a preferred embodiment, input/output device (3) is preferentially configured to receive at least one pose data of the tracked object under consideration using an inertial measurement unit (IMU) mounted to that object or an optic based high resolution multi camera pose estimation data acquisition system that is capable of generating accurate and complete pose data. By doing this, any possible position and orientation of the tracked object under real operating conditions can be simulated on the processing unit (2) with a much more realistic approach. The camera position data and mesh data are generated by a user through the input/output device by currently known computer aided modeling tools. Input/output device (3) therefore, is any interface device known in the art such as monitor, keyboard, mouse, camera or a combination.

Memory unit (4) is any volatile or non-volatile memory device known in the art such as a RAM (random access memory), ROM (read-only memory), flash memory or a hard disk. These are used to store input, output or intermediate data related to the said method (100) temporarily or permanently.

The method (100) together with the system (1) can effectively simulate a tracker system's camera and fiducial positions and pose estimation algorithm parameters to optimize the system.

Within the scope of these basic concepts, it is possible to develop a wide variety of embodiments of the inventive "system and method for measuring tracker system accuracy" (1), (100). The invention cannot be limited to the examples described herein; it is essentially according to the claims.

The invention claimed is:

1. A method for optimizing a tracker system, the method comprising the steps of:
acquiring a mesh data representing possible positions and orientations of an active marker on a tracked object, and a pose data representing possible poses of the tracked object under working conditions and at least one camera position and orientation, and establishing a coordinate system for the tracked object (101);
computing a visibility value of each node on a mesh from all camera viewports for every pose of the pose data and generating a visibility value list representing each node, wherein the visibility value represents how many times a node is visible from at least one camera viewport, considering all pose data, and wherein the visibility from any camera per pose is counted once (102) and wherein if LED fiducials are used, the visibility computation is based on the LED's normal with respect to the object coordinate system, LEDs illumination cone angle and the known pose of a head;
selecting the node with highest visibility value as an active marker placement node (103);
removing nodes which are closer to the selected node than a non-maxima suppression threshold (104);
calculating the total number of markers (selected and placed so far) that are visible for each pose to inspect which poses exceed a K marker limit, and if a pose satisfies this condition, the pose should be excluded from the pose database; (104-A)
removing the pose(s) that meet the requirements of step 104-A (105);
testing if a predetermined percentage of all poses have the predetermined number of selected nodes (106);
repeating step (102) to step (106) if the test in step (106) is negative (106a);
projecting the final selected node positions on an image plane of each camera viewport for each pose, and adding a predetermined amount of noise into 2D marker images and using the 2D marker images for calculating the pose of the mesh with respect to the camera viewports using a tracker algorithm (107);
calculating pose error by comparing a plurality of estimated positions of the markers with a plurality of real positions of the markers and calculating pose coverage which is a percentage of poses that can be estimated with the tracker algorithm by comparing tracker algorithm results with the ground truth data (108);
recording and outputting the pose error and coverage results together with a number and positions of the active marker placement nodes (109);
testing if a new optimization parameter set, pose estimation parameter set, camera location set or 3D object mesh exist (110);
starting over with new data from the step (101) if the test in step (110) is positive (110a);
selecting a camera location set, a 3D mesh data, a marker tree, an optimization parameter set and a pose estimation algorithm parameter set which satisfy at least one constraint wherein at least one constraint is selected from a group consisting of choosing a parameter set with the minimum pose error, a system with the minimum hidden poses and a system with the minimum marker number (111).

2. The method for optimizing a tracker system according to claim 1, wherein the pose data are acquired using inertial measurement units (IMU) placed on real objects under real working conditions and movements of the real objects are recorded in step (101).

3. The method for optimizing a tracker system according to claim 1, wherein the pose data are acquired using an optic based pose data acquisition system with active markers mounted on the tracked object and multiple high resolution cameras in step (101).

4. The method for optimizing a tracker system according to claim 1, further comprising using an occlusion model, which is based on a marker's normal with respect to the object coordinate system, an active marker's illumination cone angle and the pose of the object, to estimate the visibility of 3D model points in step (102).

5. The method for optimizing a tracker system according to claim 1, further comprising generating a synthetic image by adding noise onto the image after projecting node positions in step (107).

6. The method for optimizing a tracker system according to claim 1, wherein the constraint is choosing a system with the minimum pose error in step (111).

7. The method for optimizing a tracker system according to claim 1, wherein the constraint is choosing a system with the minimum hidden poses in step (111).

8. The method for optimizing a tracker system according to claim 1, wherein the constraint is choosing a system with the minimum marker number in step (111).

9. The method for optimizing a tracker system according to claim 1, wherein the step (105) is executed after placing a predetermined number of markers to the initial mesh.

10. The method for optimizing a tracker system according to claim 1, wherein the process is routed to step (110) if there is not any empty available node to select as active marker placement node in step (103).

11. A system for optimizing a tracker system comprising:
at least one processing unit configured to receive pose, mesh and camera position data, to implement the method of claim 1;
at least one input/output device connecting to the processing unit configured to receive the pose, mesh and camera position data from an outside source and to output results found by the processing unit;
at least one memory unit connecting to the processing unit configured to store the results found by the processing unit and the pose, mesh and camera position data.

12. The system for optimizing a tracker system according to claim 11, wherein the processing unit is configured to receive the pose, mesh and camera position data from the input/output device.

13. The system for optimizing a tracker system according to claim 11, wherein the processing unit is configured to receive the pose, mesh and camera position data from the memory unit.

14. The system for optimizing a tracker system according to claim 11, wherein the input/output device is configured to receive at least one pose data of a tracked object using an inertial measurement unit (IMU).

15. The system for optimizing a tracker system according to claim 11, wherein the input/output device is configured to receive at least one pose data of the tracked object using an optic based pose data acquisition system with multiple high resolution cameras that is capable of generating accurate and complete the pose data.

16. The system for optimizing a tracker system according to claim 11, wherein the input/output device is configured to receive the camera position data and mesh data.

17. The system for optimizing a tracker system according to claim 11, wherein the memory unit is a volatile memory device.

18. The system for optimizing a tracker system according to claim 11, wherein the memory unit is a non-volatile memory device.

* * * * *